US012681710B2

(12) United States Patent
    Kumar et al.

(10) Patent No.: US 12,681,710 B2
(45) Date of Patent: *Jul. 14, 2026

(54) APPLICATIONS ON DEMAND

(71) Applicant: Omnissa, LLC, Mountain View, CA (US)

(72) Inventors: Pradeep Kumar, Bangalore (IN); Umesha Margi, Bangalore (IN); Shubhra Nath, Bangalore (IN); Jairam Choudhary, Palo Alto, CA (US); Siva Praveen Mummaneni, Bangalore (IN); Himanshu Agarwal, Bangalore (IN); Gayatri Sharan Rajwade, Bangalore (IN); Varsha Jha, Bangalore (IN); Jeffrey Paul Ulatoski, Palo Alto, CA (US)

(73) Assignee: Omnissa, LLC, Mountain View, CA (US)

( * ) Notice: Subject to any disclaimer, the term of this patent is extended or adjusted under 35 U.S.C. 154(b) by 314 days.

This patent is subject to a terminal disclaimer.

(21) Appl. No.: 18/106,515

(22) Filed: Feb. 7, 2023

(65) Prior Publication Data

US 2024/0176607 A1 May 30, 2024

(30) Foreign Application Priority Data

Nov. 30, 2022 (IN) .............................. 202241068990

(51) Int. Cl.
    *G06F 8/61* (2018.01)
    *G06F 9/451* (2018.01)

(52) U.S. Cl.
    CPC ................ *G06F 8/61* (2013.01); *G06F 9/451* (2018.02)

(58) Field of Classification Search
    CPC ................................... G06F 8/61; G06F 9/451
    See application file for complete search history.

(56) References Cited

U.S. PATENT DOCUMENTS

| | | | | |
|---|---|---|---|---|
| 6,345,386 | B1 * | 2/2002 | Delo | G06F 8/61 |
| | | | | 717/176 |
| 6,754,896 | B2 * | 6/2004 | Mishra | G06F 8/61 |
| | | | | 709/224 |
| 9,292,323 | B2 * | 3/2016 | Suresh | G06F 9/452 |

(Continued)

*Primary Examiner* — Lewis A Bullock, Jr.
*Assistant Examiner* — Theodore E Hebert
(74) *Attorney, Agent, or Firm* — Kim & Stewart LLP

(57) ABSTRACT

The disclosure provides an approach for on-demand application delivery. Embodiments include determining, by an application delivery component on a computing device, a user logon event. In response to the user logon event, embodiments include receiving, from an application management server separate from the computing device, shortcut information for a set of applications associated with the user and displaying, on the computing device, simulated shortcuts for the set of applications based on the shortcut information. Embodiments include receiving, at the computing device, user input selecting a simulated shortcut of the simulated shortcuts that corresponds to an application of the set of applications. In response to the user input, embodiments include obtaining an application package of the application from the application management server, loading the application on the computing device as a virtual disk based on the application package, and launching the application on the computing device using the virtual disk.

17 Claims, 4 Drawing Sheets

(56) References Cited

U.S. PATENT DOCUMENTS

| | | | |
|---|---|---|---|
| 9,740,507 B2 * | 8/2017 | Pinto | G06F 9/452 |
| 9,990,118 B1 * | 6/2018 | Dennis | G06F 3/04817 |
| 10,949,061 B2 * | 3/2021 | Yu | G06F 3/0482 |
| 12,079,609 B2 * | 9/2024 | Ulatoski | H04L 67/34 |
| 12,105,681 B2 * | 10/2024 | Beveridge | G06F 9/45558 |
| 12,411,674 B2 * | 9/2025 | Sethi | G06F 8/60 |
| 2010/0107113 A1 * | 4/2010 | Innes | G06F 16/1734 |
| | | | 715/779 |
| 2011/0138314 A1 * | 6/2011 | Mir | G06F 9/452 |
| | | | 715/779 |
| 2011/0209064 A1 * | 8/2011 | Jorgensen | G06F 9/455 |
| | | | 709/227 |
| 2012/0226742 A1 * | 9/2012 | Momchilov | G06F 3/048 |
| | | | 709/203 |
| 2013/0111460 A1 * | 5/2013 | Mohamed | G06F 8/61 |
| | | | 717/172 |
| 2013/0282792 A1 * | 10/2013 | Graham | H04L 67/01 |
| | | | 709/203 |
| 2014/0137100 A1 * | 5/2014 | Won | H04M 1/724 |
| | | | 717/176 |
| 2016/0026534 A1 * | 1/2016 | Ru | G06F 3/04817 |
| | | | 707/652 |
| 2017/0371519 A1 * | 12/2017 | Beveridge | G06F 16/168 |
| 2020/0218429 A1 * | 7/2020 | Yu | G06F 3/0482 |

* cited by examiner

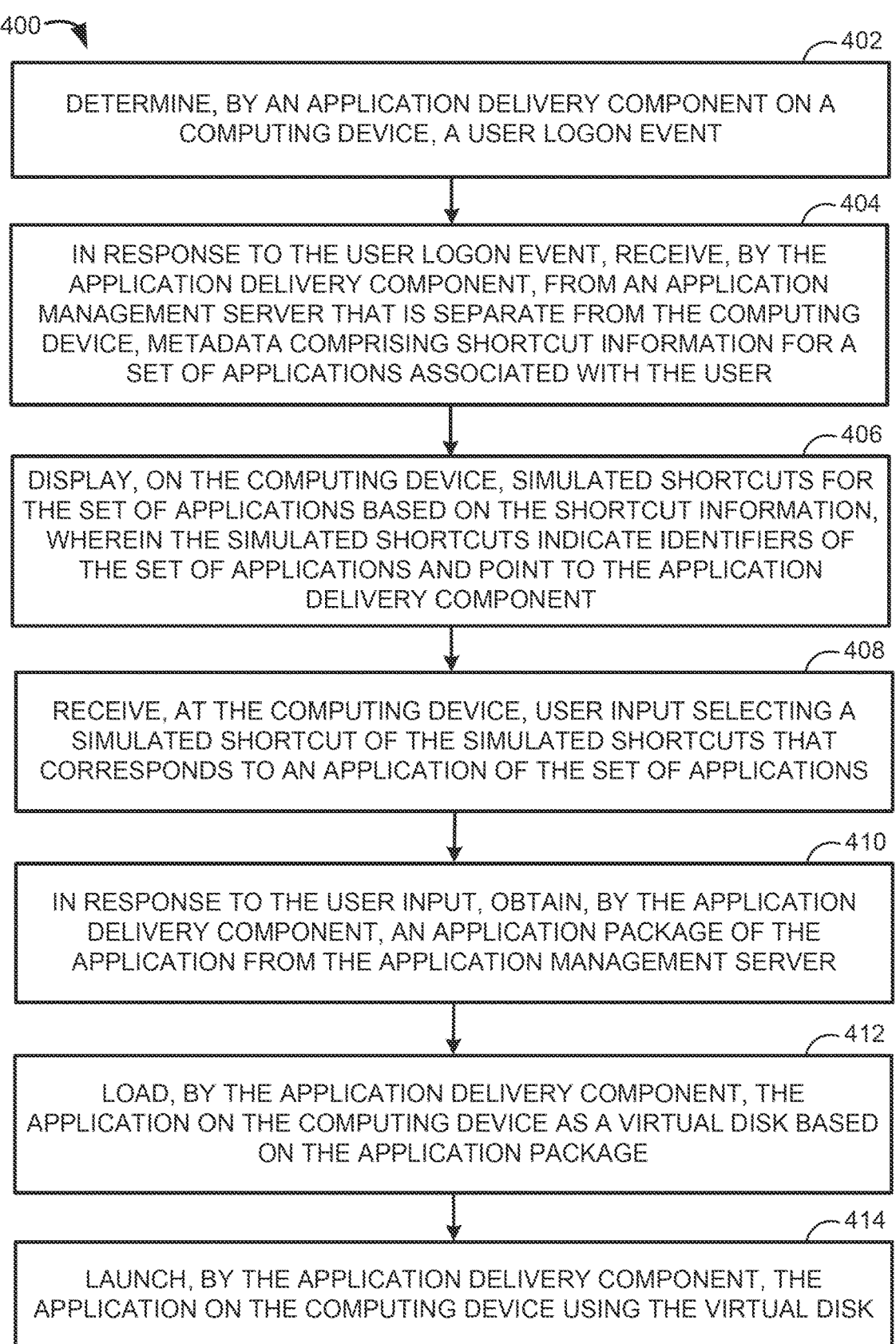

400

402
DETERMINE, BY AN APPLICATION DELIVERY COMPONENT ON A
COMPUTING DEVICE, A USER LOGON EVENT

404
IN RESPONSE TO THE USER LOGON EVENT, RECEIVE, BY THE
APPLICATION DELIVERY COMPONENT, FROM AN APPLICATION
MANAGEMENT SERVER THAT IS SEPARATE FROM THE COMPUTING
DEVICE, METADATA COMPRISING SHORTCUT INFORMATION FOR A
SET OF APPLICATIONS ASSOCIATED WITH THE USER

406
DISPLAY, ON THE COMPUTING DEVICE, SIMULATED SHORTCUTS FOR
THE SET OF APPLICATIONS BASED ON THE SHORTCUT INFORMATION,
WHEREIN THE SIMULATED SHORTCUTS INDICATE IDENTIFIERS OF
THE SET OF APPLICATIONS AND POINT TO THE APPLICATION
DELIVERY COMPONENT

408
RECEIVE, AT THE COMPUTING DEVICE, USER INPUT SELECTING A
SIMULATED SHORTCUT OF THE SIMULATED SHORTCUTS THAT
CORRESPONDS TO AN APPLICATION OF THE SET OF APPLICATIONS

410
IN RESPONSE TO THE USER INPUT, OBTAIN, BY THE APPLICATION
DELIVERY COMPONENT, AN APPLICATION PACKAGE OF THE
APPLICATION FROM THE APPLICATION MANAGEMENT SERVER

412
LOAD, BY THE APPLICATION DELIVERY COMPONENT, THE
APPLICATION ON THE COMPUTING DEVICE AS A VIRTUAL DISK BASED
ON THE APPLICATION PACKAGE

414
LAUNCH, BY THE APPLICATION DELIVERY COMPONENT, THE
APPLICATION ON THE COMPUTING DEVICE USING THE VIRTUAL DISK

FIG. 4

APPLICATIONS ON DEMAND

RELATED APPLICATION

Benefit is claimed under 35 U.S.C. 119(a)-(d) to Foreign Application Serial No. 202241068990 filed in India entitled "APPLICATIONS ON DEMAND", on Nov. 30, 2022 by VMware, Inc., which is herein incorporated in its entirety by reference for all purposes.

BACKGROUND

In a traditional application delivery model, a separate copy of an application is installed on physical disks of each computing device. In a data center with many computing devices, virtual application delivery systems can help to manage the complex task of provisioning applications to computing devices.

One type of virtual application delivery system involves applications stored on shared, read-only virtual disks. These shared virtual disks are placed in a storage system that is accessible over a network by the computing devices or that is local to a computing device. A server running a manager module configures the computing devices and mounts the virtual disks to computing devices, such as virtual machines, as read-only disks. As used herein, to "mount" a virtual disk to a computing device means to connect a virtual disk to the computing device so that data on the virtual disk is accessible to the computing device. To "mount" a virtual disk may include associating the virtual disk with a physical file (referred to herein as a "virtual disk file") stored on a storage medium. After mounting, the computing devices can then access and run the stored applications. The computing devices have an agent module. The agent module captures and redirects file-system calls to the applications on virtual disks, as needed. Accordingly, the stored applications can be virtually delivered to the computing devices instead of being individually installed locally at each computing device. One example of such a virtual application delivery system is App Volumes™ made commercially available from VMware®, Inc. of Palo Alto, California.

The mounting procedure for such virtual application delivery systems consumes time and computing resources during boot of the computing device and/or during a user logon process. Furthermore, the applications, once mounted, consume computing resources such as memory. In some cases a user may not use every application that is mounted on the computing device during a given session during which the user is logged on to the computing device, and some applications in particular may be used infrequently. Thus, existing virtual application delivery techniques may involve unnecessary utilization of computing resources and time associated with delivering and mounting applications that will not be used during a given session, and therefore may result in reduced performance without a benefit to the user. As such, there is a need in the art for improved techniques of virtual application delivery.

SUMMARY

A method described herein provides for on-demand application delivery, the method comprising: determining, by an application delivery component on a computing device, a user logon event; in response to the user logon event: receiving, by the application delivery component, from an application management server that is separate from the computing device, metadata comprising shortcut informa-tion for a set of applications associated with the user; and displaying, on the computing device, simulated shortcuts for the set of applications based on the shortcut information, wherein the simulated shortcuts indicate identifiers of the set of applications and point to the application delivery component; receiving, at the computing device, user input select-ing a simulated shortcut of the simulated shortcuts that corresponds to an application of the set of applications; and in response to the user input: obtaining, by the application delivery component, an application package of the applica-tion from the application management server; loading, by the application delivery component, the application on the computing device as a virtual disk based on the application package; and launching, by the application delivery com-ponent, the application on the computing device using the virtual disk.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

FIG. 4 depicts example operations related to on-demand application delivery, according to an embodiment.

To facilitate understanding, identical reference numerals have been used, where possible, to designate identical elements that are common to the figures. It is contemplated that elements disclosed in one embodiment may be benefi-cially utilized on other embodiments without specific reci-tation.

DETAILED DESCRIPTION

Figure 1:
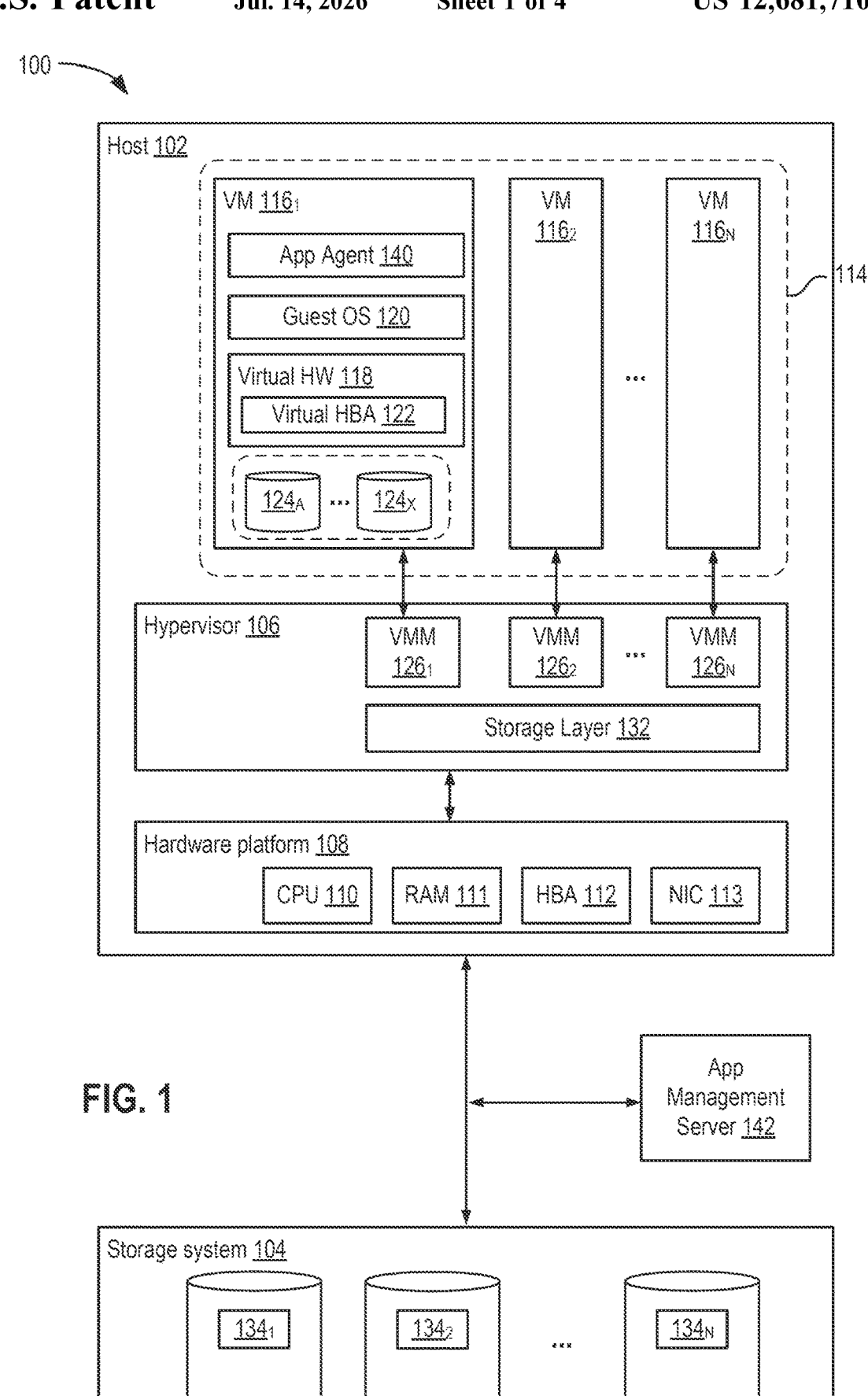
FIG. 1 depicts a block diagram of a computer system in which one or more embodiments of the present disclosure may be utilized.

The disclosure provides techniques for on-demand deliv-ery of applications, such as delivering and attaching a virtual disk for an application to a computing device at a time when a user launches the application on the computing device rather than at logon or boot time.

For example, as explained in more detail below with respect to FIG. 2, an application management server in a virtualized application delivery system may capture meta-data associated with applications, including shortcuts (e.g., on a user's desktop or start menu), icons (e.g., image files used as icons for applications), and file type associations (e.g., associating certain file extensions with certain appli-cations) and store the metadata. When a user logs on to a computing device, the application management server may deliver only the metadata for the applications associated with the user, rather than delivering the entire applications, and the computing device may display simulated shortcuts and/or file type associations (e.g., options to launch certain applications on a context menu for a file of a certain type) that appear to point to the user's applications but actually point to an application delivery agent on the computing device. When the user selects a given simulated shortcut to launch a given application (or when a request to launch the given application is initiated in a different way, such as by the user opening a file having an extension associated with the application, a different application requesting to launch the given application, and/or the like), the application delivery agent obtains the full application package from the application management server and mounts a virtual disk on the computing device for the application in order to enable launch of the application. Thus, applications are not actually delivered to a user's computing device until the user or an application requests to launch the applications. Once an application is delivered to a computing device on demand, the simulated shortcuts and/or file type associations for that application may be deleted from the computing device.

Techniques described herein provide multiple improvements over existing techniques for virtualized application delivery. For example, by waiting to deliver each application associated with a user until the application is needed rather than delivering all applications at logon or boot time, embodiments of the present disclosure significantly reduce the amount of physical computing resources and time required to logon to and/or boot a computing device and reduce the amount of physical computing resources occupied by applications on the computing device on an ongoing basis. Applications that are seldom or never used will not be unnecessarily delivered to and mounted on computing devices, thereby avoiding all of the computing resources and time associated with such deliveries and mountings. Furthermore, by simulating shortcuts and file type associations on a computing device before applications are actually delivered to the computing device, techniques described herein provide the user with a seamless experience as if the applications are already present on the computing device while improving system performance due to the reduced computing resource utilization.

FIG. 1 depicts a block diagram of a computer system 100 in which one or more embodiments of the present disclosure may be utilized. Computer system 100 includes one or more hosts 102 configured to provide a virtualization layer that abstracts processor, memory, storage, and networking resources of a hardware platform 108 into multiple virtual machines (VMs) 116 that run concurrently on the same host 102. Although this disclosure is described with reference to VM, the teachings herein also apply to other types of virtual computing instances (VCIs), such as containers, Docker containers (see, e.g., www.docker.com), data compute nodes, isolated user space instances, namespace containers, and the like.

VMs 116 run on top of a software interface layer, referred to as a hypervisor 106, which enables sharing of the hardware resources of host 102 by VMs 116. One example of hypervisor 106 is a VMware® ESXi™ hypervisor provided as part of the VMware® vSphere® solution made commercially available from VMware®, Inc. Although certain embodiments are described herein with respect to providing virtual application delivery to virtual machines, it should be noted that similar techniques may be used to provide virtual application delivery to other types of virtual computing instances or even physical computing devices. A user may access VM 116 directly via host 102, or may use remote services (e.g., remote desktop services) to access VM 116, or to access applications running on host 102 such as if host 102 is configured as a remote desktop service host.

Host 102 comprises a general purpose computer system having one or more VMs 116 accessing data stored on a storage system 104 connected via a network interface card (NIC) 113 to host 102. Host 102 may be constructed on a server-class hardware platform 108. Hardware platform 108 includes physical components of a computing device, such as a processor (CPU) 110, a memory 111, a disk interface 112, and NIC 113. Processor 110 is configured to execute instructions, for example, executable instructions that perform one or more operations described herein. The instructions may be stored in memory 111. Memory 111 and storage system 104 are devices allowing information, such as executable instructions, virtual disks, configurations, and other data, to be stored and retrieved. Memory 111 may include, for example, one or more random access memory (RAM) modules. Storage system 104 may include one or more locally attached storage devices, such as one or more hard disks, flash memory modules, solid state disks, and optical disks. In some embodiments, storage system 104 may include a shared storage system having one or more storage arrays of any type such as a network-attached storage (NAS) or a block-based device over a storage area network (SAN). Storage system 104 may be accessible by hosts 102 via a network. Disk interface 112, such as a host bus adapter (HBA), enables host 102 to communicate with storage system 104 to store virtual disks 134 that are accessed by VMs 116, as described later. Network interface 113 enables host 102 to communicate with another device via a communication medium, such as a network (not shown).

In an embodiment, storage system 104 is implemented as software-defined storage such as VMware® vSAN™ made commercially available from VMware®, Inc. Storage system 104 clusters together server-attached hard disks and/or solid state drives (HDDs and/or SSDs), to create a flash-optimized, highly resilient shared datastore designed for virtual environments.

While storage system 104 is typically made up of a plurality of disks, other forms of storage, such as solid-state non-volatile storage devices may be used, and the use of the term, "disk" herein, should therefore not be construed as limited only to rotating disk storage media, but may also be construed to encompass SSDs and other storage devices. In some embodiments, storage system 104 comprises high-density non-volatile memory. Further, while storage system 104 is depicted as a separate, external component to host 102, storage system 104 may be internal to host 102 as a local storage device or a locally attached storage.

As shown in FIG. 1, hypervisor 106 is installed on top of hardware platform 108 and supports a virtual machine execution space 114 within which multiple VMs $116_1$-$116_N$ are instantiated and executed. Each VM $116_1$-$116_N$ implements a virtual hardware platform 118 that supports the installation of a guest operating system (OS) 120. Guest OS 120 is capable of executing one or more applications, including app agent 140, which may be installed on guest OS 120. Examples of guest OS 120 include any of the well-known commodity operating systems, such as Microsoft Windows, Linux, and the like. In each instance, guest OS 120 includes a native file system layer, such as new technology file system (NTFS) or an ext3 type file system layer. These file system layers interface with virtual hardware platforms 118 to access, from the perspective of guest OSs 120, a data storage HBA, which is virtual HBA 122 implemented by virtual hardware platform 118. Virtual hardware platform 118 provides the appearance of disk storage support to guest OS 120, and the disk storage support is provided through virtual disks $124_A$-$124_X$, which are mapped through hypervisor 106 to virtual disk files 134 on physical disks of storage system 104.

Virtual disk 124 exposes the same abstraction as a physical disk, that is, a linear list of sectors. However, a virtual machine monitor (VMM) may implement virtual disks 124 as files on host 102. From the perspective of guest OS 120, file system calls initiated by guest OS 120 appear to be routed to virtual disks $124_A$-$124_X$ for final execution, but such calls are processed and passed through virtual HBA 122, to VMM layers $126_1$-$126_N$, where the calls are translated into calls to virtual disk file 134 on storage system 104. HBA emulator of each VMM 126 functionally enables the data transfer and control operations to be correctly handled by hypervisor 106, which ultimately passes such operations through its various layers to true hardware HBAs 112 or NIC 113 that connect to storage system 104. That is, virtual disk 124 is a logical abstraction of a storage disk, the virtual disk 124 being implemented within VM 116. The virtual disk 124 is associated with a physical file present on storage system 104, and the physical file stores actual data that is associated with virtual disk 124. The physical file associated with virtual disk 124 is herein referred to as virtual disk file 134. Virtual disk 124 may be referred to as a "volume" or as an "app stack."

Hypervisor 106 includes a storage layer 132 configured to manage storage space persistently for VMs 116 via VMM layers $126_1$ to $126_N$. In one embodiment, storage layer 132 may include numerous logical layers, such as an I/O virtualization layer, a file system driver, and a disk access layer. In some embodiments, the I/O virtualization layer receives a data transfer and control operation, in the form of I/O commands intended for virtual disk 124, from VMM layers $126_1$ to $126_N$. The I/O virtualization layer converts the operations into file system operations that are understood by a virtual machine file system (VMFS) driver in order to access virtual disk file 134 stored in underlying storage system 104 under the management of the VMFS driver that represents virtual disk 124. The I/O virtualization layer issues these file system operations to the VMFS driver.

The VMFS driver, in general, manages creation, use, and deletion of virtual disk files 134 (e.g., .vmdk files representing virtual disks) stored on physical locations of storage system 104, or stored in logical volumes or Logical Unit Numbers (LUNs) exposed by storage system 104. The VMFS driver converts the file system operations received from the I/O virtualization layer to raw small computer system interface (SCSI) operations, which are issued to a data access layer that applies command queuing and scheduling policies to the raw SCSI operations and ultimately sends the raw SCSI operations to components of physical hardware platform 108. While storage layer 132 is depicted as part of a virtualized architecture, storage layer 132 may be part of other software modules. For example, in an embodiment, storage layer 132 is a file system driver of an OS that manages storage space persistently for locally attached storage.

It is noted that while certain examples are described with respect to VMs, VMFS drivers, and the like, techniques described herein may also be used for other types of computing devices and file systems.

Storage system 104 stores virtual disk files 134. Virtual disk file 134 may be of the type .vmdk, VHD, .HDD, .VDI, etc. Each virtual disk file 134 may contain one or more partitions containing an application and a file system to organize files of the application and manage access to the application. For example, a virtual disk file 134 may be partitioned by any of the virtual disk partitioning methods known in the art, such as the master boot record (MBR) method and the globally unique identifiers (GUID) partition table (GPT) method. In an embodiment, each partition contains no more than a single application.

Each application contains all files of the application needed by guest OS 120 to run the application. The application may contain a registry file, a folder containing service and library modules, and a folder containing data files. The registry file contains metadata on the files of the application, such as file names, version number, etc. The service and library modules comprise logic and application programming interfaces (APIs) needed for the application to execute. Data files comprise data used by the application when executing, such as configuration data.

VM 116 is configured to mount virtual disk files 134 as virtual disks 124 accessible by VM 116. VM 116 performs the mounting in conjunction with hypervisor 106. App agent 140 running on VM 116 is configured to run as a service on VM 116 and to use drivers, such as filter drivers to handle application calls to applications and to handle file-system redirects to virtual disk file 134. In one example, app agent 140 is a file system driver. In an embodiment, VM 116 has a limit as to the number of virtual disks 124 that can be mounted to VM 116. For example, the maximum number of virtual disks that can be mounted to VM 116 may be 1, 2, 10, 100, 1000, or 10,000.

For example, in order to mount virtual disk file 134 as a virtual disk 124, such as on demand as described herein, app agent 140 communicates with an app management server 142 coupled to storage system 104 and host 102. App agent 140 determines which applications on virtual disk files 134 are assigned to VM 116 or to a user account accessing VM 116, such as by requesting such information from app management server 142. Assignment of VM 116 to virtual disk file 134 means that VM 116 has access rights to that virtual disk file 134. App management server 142 may then direct hypervisor 106 to mount the assigned virtual disk file 134 in VM 116.

App agent 140 uses information on virtual disk 124, such as configuration information for applications, middleware, and/or data files, to make applications stored on virtual disk 124 available to VM 116. App agent 140 redirects calls to applications to virtual disk 124. Virtual disk 124 representing virtual disk file 134 may be mounted as a single read-only volume on VM 116. Mounting as read-only avoids write conflicts between multiple computing devices, because the same virtual disk file 134 may be mounted by multiple computing devices. Alternatively, a virtual disk file 124 containing an application may be mounted on VM 116 independently of virtual disk files 134, and may not be a read-only volume.

As described in more detail below with respect to FIGS. 2-4, application delivery may be delayed until application launch time rather than delivering all applications at logon time. Instead, metadata comprising shortcuts and file type associations may be delivered to VM 116 at logon time, and simulated shortcuts and file type associations may be displayed on VM 116 until the a request is received to launch the given application (e.g., via one of the simulated shortcuts or file type associations). Once the user or an application requests to launch a given application, the given application may be delivered to VM 116 (e.g., as described above), such as mounting a virtual disk 124 on VM 116 representing a virtual disk file 134 containing the application so that the application can be launched and utilized on VM 116. The simulated shortcuts and file type associations for the given application may be deleted once the given application is delivered to VM 116.

It is noted that while shortcuts and file type associations are includes as examples of application metadata that may be captured and delivered to a computing device at logon time, other types of metadata may also be included. For example, registered paths associated with an application may also be included in metadata of the application. Furthermore, while certain embodiments involve delivering an application to a computing device when a user requests to launch the application, embodiments may also include delivering an application to a computing device when an automated process (e.g., a different application, the operating system, and/or the like) requests to launch the application.

Figure 2:
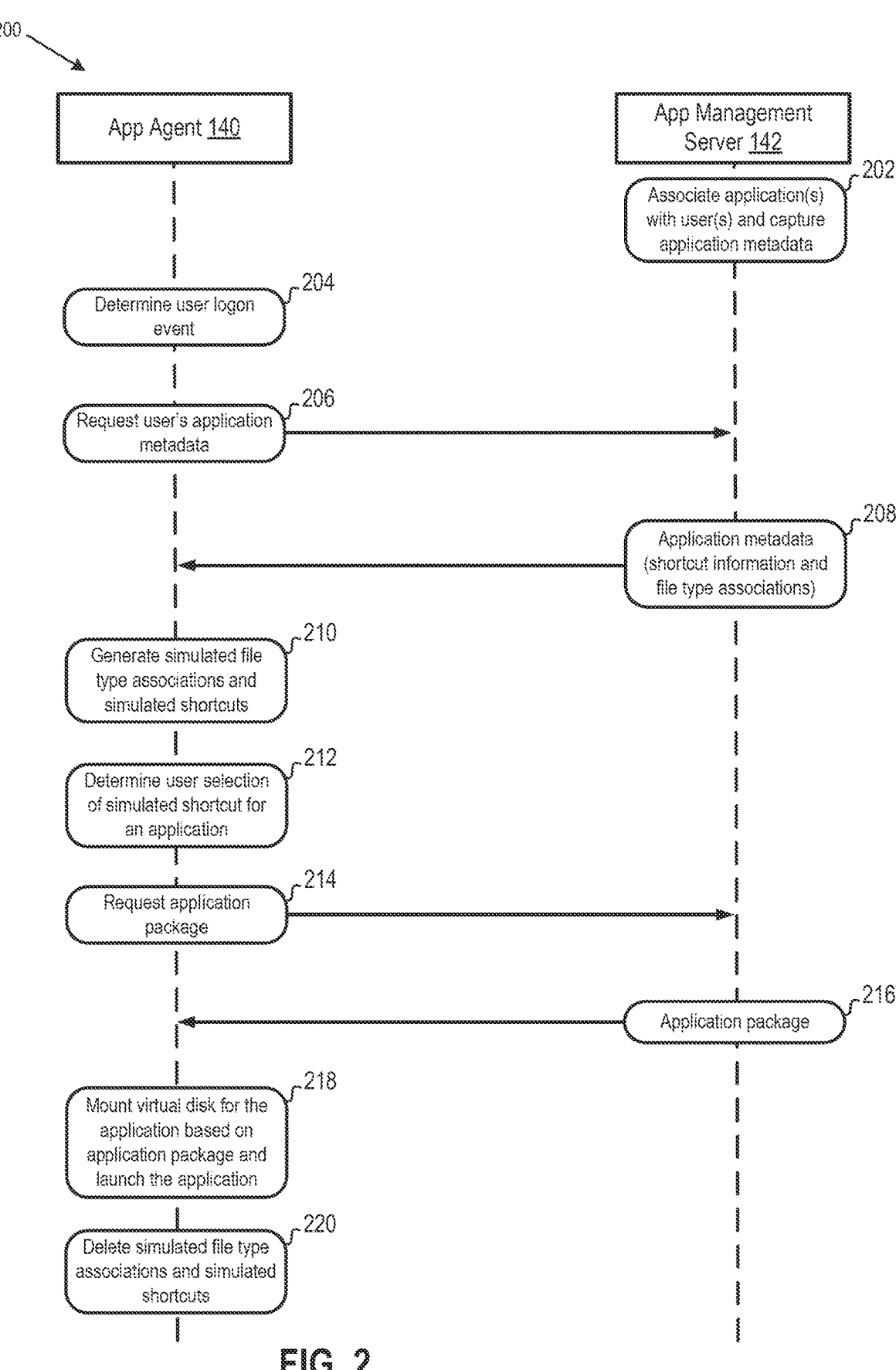
FIG. 2 depicts an exchange of messages between com-ponents related to on-demand application delivery, accord-ing to an embodiment.

FIG. 2 depicts an example exchange 200 of messages between components related to on-demand application delivery. Exchange 200 includes app agent 140 and app management server 142 of FIG. 1.

At block 202, app management server 142 associates one or more applications with one or more users and captures application metadata related to the applications. Associations between applications and users may be determined based on input from one or more administrators that grant users access to particular applications, such as installing applications on users' computing devices. App management server 142 may store a list of applications that are associated with each user of the distributed application delivery system. Furthermore, app management server 142 captures metadata about each application for each user, including shortcut information (e.g., icons and/or text to be displayed with each shortcut, such as desktop and/or start menu shortcuts) and file type associations (e.g., which applications are configured to open certain file extensions and, in some cases, default applications for certain file extensions). File type associations may include associations between file extensions and application identifiers (e.g., program identifiers). For example, an existing process by which app management server 142 captures applications may be extended to include the metadata capture. Shortcut information may be captured from a computing device on which the shortcuts were configured (e.g., from an operating system) and file type associations may be captured from a registry of a virtual disk of the application. Metadata may also include other types of information related to an application, such as registered paths of an application (e.g., file paths that are registered for storing information related to the application). The metadata may be stored in a metadata file accessible by app management server 142, such as in storage system 104 of FIG. 1. In some embodiments, the metadata file for an application is stored in association with a virtual disk of the application. The metadata file may be, for example, a JavaScript Object Notation (JSON) file. Other types of files may alternatively be used.

At block 204, app agent 140 determines a user logon event. For example, app agent 140 (running on a computing device such as a VM 116 of FIG. 1) may be invoked as part of a logon process whereby a user logs onto the computing device.

At block 206, app agent 140 requests the user's application metadata from app management server 142. For example, app agent 140 may send a request to app management server 142 for a list of applications that are associated with the user (e.g., including a user identifier of the user) and, in the same or a separate request, may request the metadata of the applications. App management server 142 may determine which applications are associated with the user (e.g., based on the user identifier and the associations stored at block 202) and retrieve the metadata that was captured at block 202 for those applications. In an example, app management server 142 reads a JSON file for each application associated with the user in order to determine the shortcut information and file type associations for the application.

At block 208, app management server 142 sends the application metadata for each application associated with the user to app agent 140. The metadata includes shortcut information and file type associations. The shortcut information may include, for example, icons and/or text to display for the shortcuts (e.g., indicating names of applications). The shortcut information may also include information about where shortcuts should be placed, such as on the user's desktop and/or on the user's start menu or other type of programs list.

At block 210, app agent 140 generates simulated file type associations and simulated shortcuts based on the application metadata received at block 208. Simulated file type associations may include creating entries in context menus for files of certain types so that simulated shortcuts for appropriate associated applications are displayed for particular file extensions and/or so that opening files of certain types will cause app agent 140 to be invoked in order to obtain delivery of certain applications configured as default applications for those types. Generating simulated shortcuts, as described in more detail below with respect to FIG. 2, generally includes creating shortcuts (e.g., on the user's desktop, start menu, and/or at other locations) that appear to be for certain applications, such as including icons and/or text (e.g., application names) for those applications, while actually pointing to app agent 140. For example, a given simulated shortcut may display an icon and name of a particular application while a target of the shortcut may be app agent 140 so that, when the shortcut is selected, app agent 140 may obtain the application from app management server 142.

At block 212, app agent 140 determines a user selection of a simulated shortcut for an application. For example, a user may click on a simulated shortcut and app agent 140 may be invoked accordingly (e.g., because app agent 140 is the target of the simulated shortcut). In certain embodiments, a user selection of a file is determined, such as a file having an extension that is associated with the application (e.g., via a simulated file type association). In other embodiments, an automated process rather than a user action may request to launch the application. For example, the application may be invoked by a different application. The application may be delivered on demand, whether the demand comes from a user or another application or system, and whether the demand is based on a direct launching of the application, such as via a shortcut, or an indirect launching of the application, such as via a file type association.

At block 214, app agent 140 requests an application package for the application from app management server 142.

At block 216, app management server 142 delivers the requested application package to app agent 140. The application package may be in the form of a virtual disk file that includes all files needed to run the application. In some embodiments, delivering the application package comprises delivering information needed to mount a virtual disk on the computing device so that the application can be run on the computing device (e.g., the virtual disk may point to a remote virtual disk file as described above with respect to FIG. 1). Alternative methods of application delivery may be used without departing from the scope of the present disclosure.

At block 218, app agent 140 mounts a virtual disk for the application on the computing device based on the application package received at block 216, and launches the application using the virtual disk. An example mounting process is described above with respect to FIG. 1, although alternative techniques for mounting and/or otherwise loading the application on the computing device may alternatively be used.

At block 220, the simulated file type associations and simulated shortcuts are deleted from the computing device. For example, once the real shortcuts and/or file type associations related to the application are configured on the computing device (e.g., as part of or in conjunction with the mounting process), the simulated shortcuts and file type associations will be obsolete and can be removed, as described in more detail with respect to FIG. 3.

Figure 3:
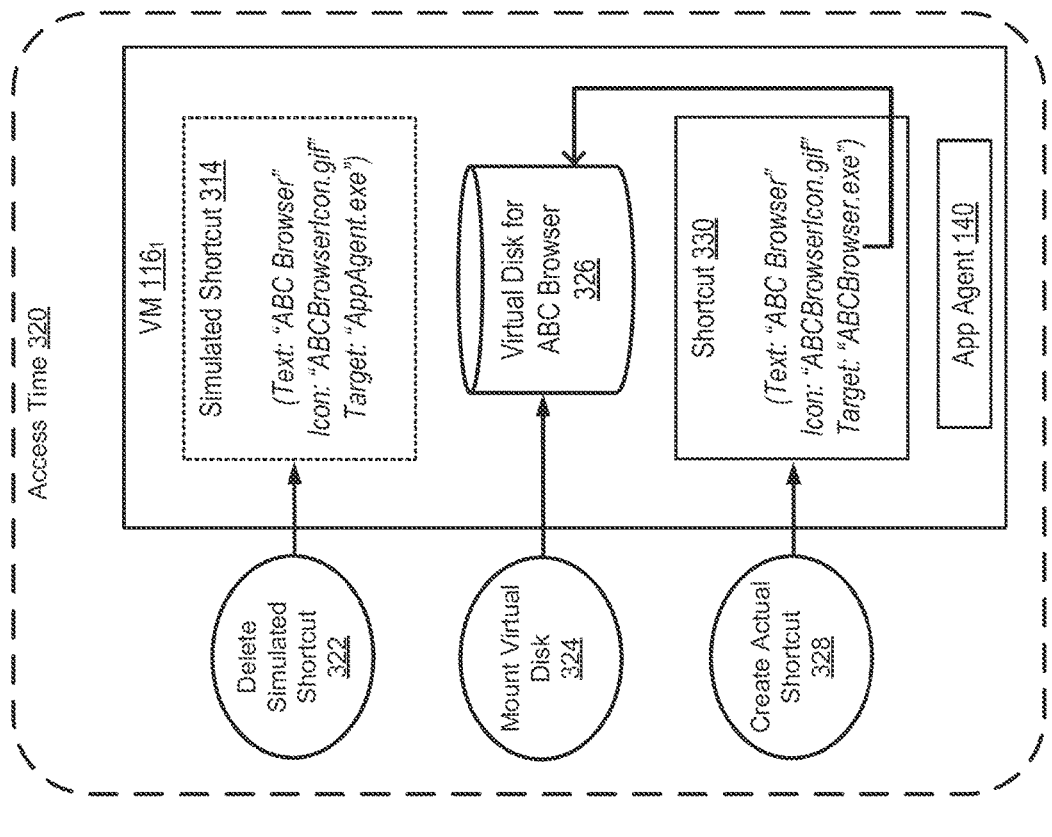
FIG. 3 depicts an example related to on-demand applica-tion delivery, according to an embodiment.
Figure 3:
Figure 3:
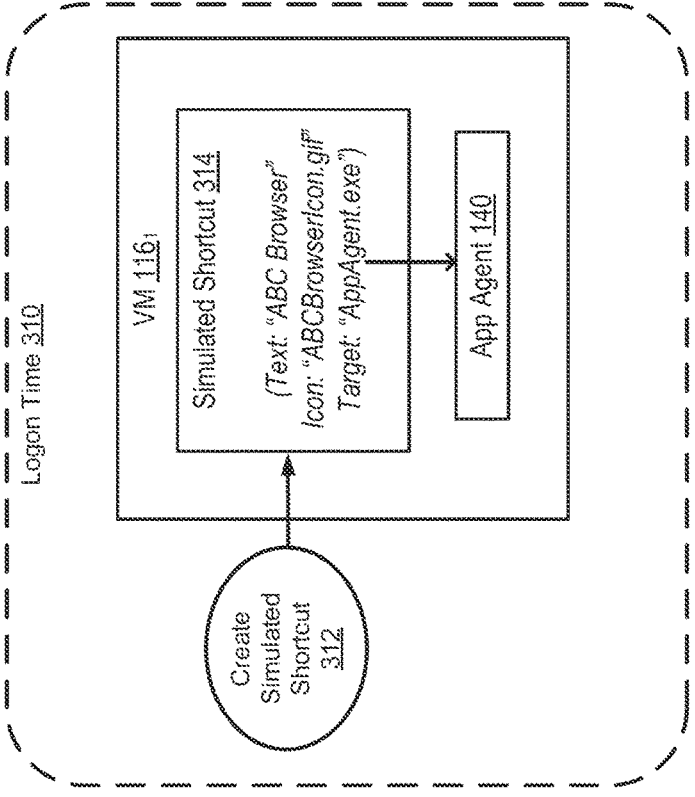

FIG. 3 depicts an example related to on-demand application delivery, according to an embodiment. FIG. 3 includes VM 116₁ and app agent 140 of FIG. 1.

Logon time 310 represents a time at which a user logs on to VM 116₁. Operation 312 represents the creation of a simulated shortcut 314 for an application associated with the user. The application is named "ABC Browser". Simulated shortcut 314 includes the text "ABC Browser" and an icon "ABCBrowserIcon.gif", and the target of simulated shortcut is "AppAgent.exe", which represents an executable file of app agent 140. Simulated shortcut 314 is included as an example, and other techniques of creating a simulated shortcut for an application that points to a process for invoking delivery of the application may also be used.

Selecting simulated shortcut 314 causes app agent 140 to be invoked in order to initiate a process for delivering the application "ABC Browser" to VM 116₁.

Access time 320 represents a time at which an application is accessed, such as when a user clicks on simulated shortcut 314 to launch the application, when the user opens a file that is associated with the application via a simulated file type association, or when another application requests to launch the application. At operation 322, simulated shortcut 314 is deleted. At operation 324, a virtual disk 326 for the application "ABC Browser" is mounted on VM 116₁. For example, a mounting process such as that described above with respect to FIG. 1 may be performed, and virtual disk 326 may point to a virtual disk file located in a remote data store. Virtual disk 326 may comprise a file system, and may be mounted separately from one or more other file systems associated with an operating system of VM 116₁.

At operation 328, an actual shortcut 330 is displayed for the application "ABC Browser". For example, actual shortcut 328 may have been captured in the virtual disk, and is virtualized by app agent 140. Shortcut 330 includes the text "ABC Browser" and an icon "ABCBrowserIcon.gif", and the target of simulated shortcut is "ABCBrowser.exe", which represents an executable file of the application that is accessible via virtual disk 326. Thus, when shortcut 330 is accessed, app agent 140 launches the application using virtual disk 326.

It is noted that operations 322, 324, and 328 may be performed in any order.

FIG. 4 depicts example operations 400 related to on-demand application delivery. For example, operations 400 may be performed by app agent 140 and/or app management server 142 of FIGS. 1 and 2.

Operations 400 begin at step 402, with determining, by an application delivery component on a computing device, a user logon event.

In some embodiments, the application delivery component is a file system driver installed on the computing device. For example, the application delivery component may be app agent 140 of FIGS. 1-3. The computing device may, for example, be VM 116₁ of FIG. 1.

Operations 400 continue at step 404, with, in response to the user logon event, receiving, by the application delivery component, from an application management server that is separate from the computing device, metadata comprising shortcut information for a set of applications associated with the user. The application management server may, for example, be app management server 142 of FIGS. 1 and 2.

In some embodiments, the metadata was captured by the application management server prior to the user logon event, and was stored in a file accessible by the application server, such as a JSON file. The shortcut information may comprise, for example, icons and the identifiers, and the simulated shortcuts may comprise the icons.

In certain embodiments, the metadata further comprises file type association information for the set of applications. For example, the operations may further comprise receiving additional user input opening a file corresponding to a file type and, in response to the additional user input, determining, by the application delivery component, based on the file type association information, a given application of the set of applications that is associated with the file type. the operations may further comprise, in response to the additional user input, obtaining, by the application delivery component, a given application package of the given application from the application management server and loading, by the application delivery component, the given application on the computing device as an additional virtual disk based on the given application package. The operations may further comprise, in response to the additional user input, launching, by the application delivery component, the given application on the computing device using the additional virtual disk.

Operations 400 continue at step 406, with displaying, on the computing device, simulated shortcuts for the set of applications based on the shortcut information, wherein the simulated shortcuts indicate identifiers of the set of applications and point to the application delivery component.

Operations 400 continue at step 408, with receiving, at the computing device, user input selecting a simulated shortcut of the simulated shortcuts that corresponds to an application of the set of applications.

Operations 400 continue at step 410, with, in response to the user input, obtaining, by the application delivery component, an application package of the application from the application management server.

Operations 400 continue at step 412, with loading, by the application delivery component, the application on the computing device as a virtual disk based on the application package.

In some embodiments, the virtual disk is mounted on the computing device, and an operating system of the computing device redirects read and write operations related to the application to the virtual disk.

For example, in some embodiments, the virtual disk mounted on the computing device comprises a file system separate from one or more other file systems associated with the operating system.

Operations 400 continue at step 414, with launching, by the application delivery component, the application on the computing device using the virtual disk.

Some embodiments further comprise, in response to the user input, removing the simulated shortcut from the computing device.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, application specific integrated circuits (ASICs), field-programmable gate arrays (FPGAs), and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of on-demand application delivery, the method comprising:
   determining, by an application delivery component on a computing device, a user logon event;
   in response to the user logon event:
      receiving, by the application delivery component, from an application management server that is separate from the computing device, metadata comprising shortcut information for a set of applications associated with the user; and displaying, on the computing device, simulated shortcuts for the set of applications based on the shortcut information, wherein the simulated shortcuts indicate identifiers of the set of applications and point to the application delivery component;

receiving, at the computing device, user input selecting a simulated shortcut of the simulated shortcuts in an operating system shortcut location, wherein the simulated shortcut corresponds to an application of the set of applications; and in response to the user input:

obtaining, by the application delivery component, an application package of the application from the application management server;

loading, by the application delivery component, the application on the computing device by mounting a virtual disk based on the application package, wherein loading the application causes an executable file of the application stored on the mounted virtual disk to be made accessible to an operating system of the computing device;

after the executable file becomes accessible on the mounted virtual disk, deleting, by the application delivery component, the simulated shortcut from the operating system shortcut location;

creating, by the application delivery component, an actual shortcut in the operating system shortcut location from which the simulated shortcut was deleted, wherein the actual shortcut references a file path of the executable file stored on the mounted virtual disk; and launching, by the application delivery component, the application on the computing device using the virtual disk.

2. The method of claim 1, wherein the metadata was captured by the application management server prior to the user logon event, and wherein the metadata was stored in a file accessible by the application management server.

3. The method of claim 1, wherein the shortcut information comprises icons and the identifiers, and wherein the simulated shortcuts comprise the icons.

4. The method of claim 1, wherein the metadata further comprises file type association information for the set of applications, and wherein the method further comprises:

receiving additional user input to open a file corresponding to a file type; and in response to the additional user input:

determining, by the application delivery component, based on the file type association information, a given application of the set of applications that is associated with the file type;

obtaining, by the application delivery component, a given application package of the given application from the application management server;

loading, by the application delivery component, the given application on the computing device as an additional virtual disk based on the given application package; and launching, by the application delivery component, the given application on the computing device using the additional virtual disk.

5. The method of claim 1, wherein an operating system of the computing device redirects read and write operations related to the application to the mounted virtual disk.

6. The method of claim 5, wherein the virtual disk mounted on the computing device comprises a file system separate from one or more other file systems associated with the operating system.

7. The method of claim 1, wherein the application delivery component is a file system driver installed on the computing device.

8. A system for on-demand application delivery, the system comprising:

at least one memory; and at least one processor coupled to the at least one memory, the at least one processor and the at least one memory configured to:

determine, by an application delivery component on a computing device, a user logon event;

in response to the user logon event:

receive, by the application delivery component, from an application management server that is separate from the computing device, metadata comprising shortcut information for a set of applications associated with the user; and display, on the computing device, simulated shortcuts for the set of applications based on the shortcut information, wherein the simulated shortcuts indicate identifiers of the set of applications and point to the application delivery component;

receive, at the computing device, user input selecting a simulated shortcut of the simulated shortcuts in an operating system shortcut location, wherein the simulated shortcut corresponds to an application of the set of applications; and in response to the user input:

obtain, by the application delivery component, an application package of the application from the application management server;

load, by the application delivery component, the application on the computing device by mounting a virtual disk based on the application package, wherein loading the application causes an executable file of the application stored on the mounted virtual disk to be made accessible to an operating system of the computing device;

after the executable file becomes accessible on the mounted virtual disk, delete, by the application delivery component, the simulated shortcut from the operating system shortcut location;

create, by the application delivery component, an actual shortcut in the operating system shortcut location from which the simulated shortcut was deleted, wherein the actual shortcut references a file path of the executable file stored on the mounted virtual disk; and launch, by the application delivery component, the application on the computing device using the virtual disk.

9. The system of claim 8, wherein the metadata was captured by the application management server prior to the user logon event, and wherein the metadata was stored in a file accessible by the application management server.

10. The system of claim 8, wherein the shortcut information comprises icons and the identifiers, and wherein the simulated shortcuts comprise the icons.

11. The system of claim 8, wherein the metadata further comprises file type association information for the set of applications, and wherein the at least one processor and the at least one memory are further configured to:

receive additional user input to open a file corresponding to a file type; and in response to the additional user input:

determine, by the application delivery component, based on the file type association information, a given application of the set of applications that is associated with the file type;

obtain, by the application delivery component, a given application package of the given application from the application management server;

load, by the application delivery component, the given application on the computing device as an additional virtual disk based on the given application package; and launch, by the application delivery component, the given application on the computing device using the additional virtual disk.

12. The system of claim 8, wherein an operating system of the computing device redirects read and write operations related to the application to the mounted virtual disk.

13. The system of claim 12, wherein the virtual disk mounted on the computing device comprises a file system separate from one or more other file systems associated with the operating system.

14. The system of claim 8, wherein the application delivery component is a file system driver installed on the computing device.

15. A non-transitory computer-readable medium storing instructions that, when executed by one or more processors, cause the one or more processors to:

determine, by an application delivery component on a computing device, a user logon event;

in response to the user logon event:

receive, by the application delivery component, from an application management server that is separate from the computing device, metadata comprising shortcut information for a set of applications associated with the user; and display, on the computing device, simulated shortcuts for the set of applications based on the shortcut information, wherein the simulated shortcuts indicate identifiers of the set of applications and point to the application delivery component;

receive, at the computing device, user input selecting a simulated shortcut of the simulated shortcuts in an operating system shortcut location, wherein the simulated shortcut corresponds to an application of the set of applications; and in response to the user input:

obtain, by the application delivery component, an application package of the application from the application management server;

load, by the application delivery component, the application on the computing device by mounting a virtual disk based on the application package, wherein loading the application causes an executable file of the application stored on the mounted virtual disk to be made accessible to an operating system of the computing device;

after the executable file becomes accessible on the mounted virtual disk, delete, by the application delivery component, the simulated shortcut from the operating system shortcut location;

create, by the application delivery component, an actual shortcut in the operating system shortcut location from which the simulated shortcut was deleted, wherein the actual shortcut references a file path of the executable file stored on the mounted virtual disk; and launch, by the application delivery component, the application on the computing device using the virtual disk.

16. The non-transitory computer-readable medium of claim 15, wherein the metadata was captured by the application management server prior to the user logon event, and wherein the metadata was stored in a file accessible by the application management server.

17. The non-transitory computer-readable medium of claim 15, wherein the shortcut information comprises icons and the identifiers, and wherein the simulated shortcuts comprise the icons.

\* \* \* \* \*